United States Patent
Lee et al.

(10) Patent No.: US 9,459,477 B2
(45) Date of Patent: Oct. 4, 2016

(54) DISPLAY APPARATUS

(71) Applicant: Samsung Display Co., Ltd., Yongin, Gyeonggi-Do (KR)

(72) Inventors: Donghyeon Lee, Seoul (KR); Wonjin Kim, Chungcheongnam-do (KR); Sangheon Ye, Cheonan-si (KR); Sang Hoon Lee, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 184 days.

(21) Appl. No.: 14/050,552

(22) Filed: Oct. 10, 2013

(65) Prior Publication Data

US 2014/0362325 A1    Dec. 11, 2014

(30) Foreign Application Priority Data

Jun. 5, 2013 (KR) .......................... 10-2013-0064668

(51) Int. Cl.
*G02F 1/1333* (2006.01)

(52) U.S. Cl.
CPC .............. *G02F 1/133308* (2013.01); *G02F 2001/133314* (2013.01); *G02F 2001/133322* (2013.01)

(58) Field of Classification Search
None
See application file for complete search history.

(56) References Cited

U.S. PATENT DOCUMENTS

| | | | |
|---|---|---|---|
| 7,095,457 B2 * | 8/2006 | Chou | H04N 5/64 345/102 |
| 7,690,832 B2 | 4/2010 | Kang et al. | |
| 7,724,317 B2 * | 5/2010 | Kim et al. | 349/58 |
| 2003/0103170 A1 * | 6/2003 | Nagata et al. | 348/794 |
| 2006/0256068 A1 * | 11/2006 | Narushige | G09G 3/002 345/102 |
| 2009/0040416 A1 * | 2/2009 | Kim et al. | 349/58 |
| 2009/0122520 A1 * | 5/2009 | Kuroiwa | 362/97.2 |
| 2010/0149453 A1 | 6/2010 | Lee et al. | |
| 2012/0063168 A1 * | 3/2012 | Nambu et al. | 362/609 |
| 2013/0027965 A1 * | 1/2013 | Noh et al. | 362/602 |

FOREIGN PATENT DOCUMENTS

| | | | |
|---|---|---|---|
| KR | 1020040035122 A | | 4/2004 |
| KR | 1020050070718 A | | 7/2005 |
| KR | 1020060010598 A | | 2/2006 |
| KR | 1020070023211 B1 | | 2/2007 |
| KR | 1020070084946 A | | 8/2007 |
| KR | 1020080047198 A | | 5/2008 |
| KR | 10-2008-0069745 | * | 7/2008 |
| KR | 1020080068327 A | | 7/2008 |
| KR | 1020080069745 A | | 7/2008 |

* cited by examiner

Primary Examiner — Ryan Crockett
(74) Attorney, Agent, or Firm — Cantor Colburn LLP

(57) ABSTRACT

A display apparatus includes a bottom plate, a mold frame coupled to the bottom plate to define a receiving space, a backlight unit which is configured to be accommodated in the receiving space and generate light; a sliding recess which is defined by portions of the mold frame and exposed to the receiving space, an inlet portion which is defined by the mold frame and bottom plate, and exposes the receiving space and a side portion of the backlight unit accommodated in the receiving space; a side mold which covers the side portion of the accommodated backlight unit exposed by the inlet portion; and a display unit which is on an upper end of the mold frame and configured to receive the light to display an image. The backlight unit is accommodated in the receiving space through the inlet portion and along the sliding recess.

15 Claims, 11 Drawing Sheets

DISPLAY APPARATUS

This application claims priority to Korean Patent Application No. 10-2013-0064668, filed on Jun. 5, 2013, and all the benefits accruing therefrom under 35 U.S.C. §119, the contents of which are hereby incorporated by reference in its entirety.

BACKGROUND

1. Field

The invention relates to a display apparatus. More particularly, the invention relates to a display apparatus having a narrow bezel structure.

2. Description of the Related Art

In general, a flat panel display apparatus, such as a liquid crystal display, includes a display panel to display an image and a backlight unit to supply light to the display panel.

The flat panel display apparatus includes a bottom chassis, a mold frame and a top chassis as a receiving container to couple the display panel and the backlight unit. The bottom chassis includes a bottom portion, and a sidewall extended from the bottom portion, and the sidewall is coupled to the mold frame. When the backlight unit is accommodated in the mold frame and the bottom chassis, the display panel is placed on the mold frame.

The top chassis includes a cover portion, and a sidewall extended from the cover portion to face the sidewall of the bottom chassis. Thus, the top chassis faces the bottom chassis while being coupled to the bottom chassis, and thus the display panel is fixed to the backlight unit.

A narrow bezel structure is applied to the display apparatus to reduce an overall size of the display apparatus, but the above-mentioned structure of the receiving container is difficult to realize the narrow bezel structure. Thus, there remains a need for a display apparatus having a reduced bezel structure.

SUMMARY

One or more exemplary embodiment of the invention provides a display apparatus capable of realizing a narrow bezel structure.

An exemplary embodiment of the invention provides a display apparatus including a bottom plate; a mold frame coupled to the bottom plate to define a receiving space, a backlight unit which is configured to be accommodated in the receiving space and generate light; a sliding recess which is defined by portions of the mold frame and exposed to the receiving space, an inlet portion which is defined by the mold frame and bottom plate, and exposes the receiving space and a side portion of the backlight unit accommodated in the receiving space; a side mold which covers the side portion of the accommodated backlight unit exposed by the inlet portion; and a display unit which is on an upper end of the mold frame and configured to receive the light to display an image. The backlight unit is accommodated in the receiving space through the inlet portion and along the sliding recess.

According to one or more exemplary embodiment of the above, the receiving space is defined by the bottom plate and the mold frame, and the sliding recess is defined in the inner sidewall of the mold frame. Accordingly, the backlight unit is accommodated in the receiving space after sliding along the sliding recess. As a result, a narrow bezel structure of the display apparatus may be realized, and thus an outer or overall size of the display apparatus may be reduced.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
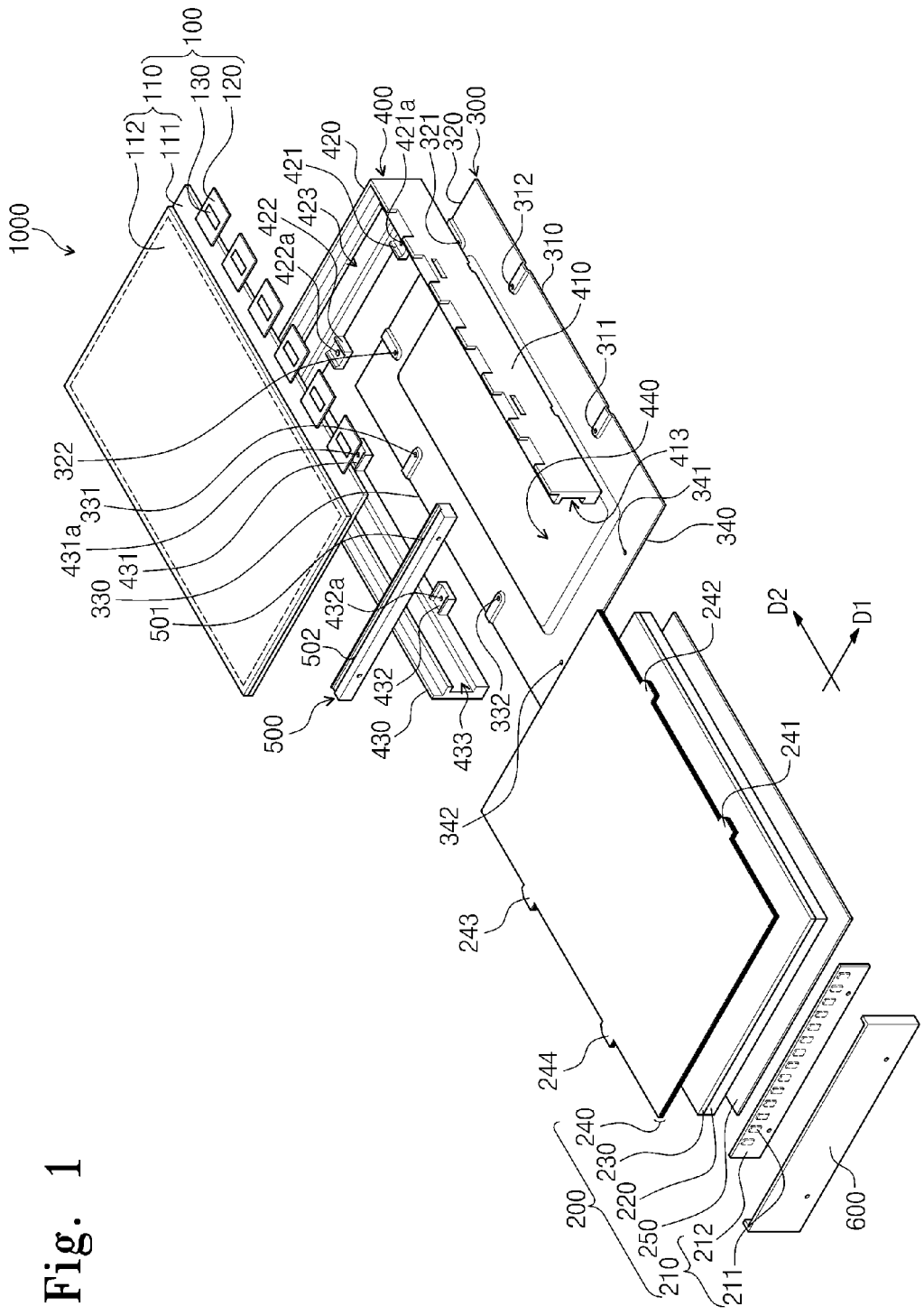
FIG. 1 is an exploded perspective view showing an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "lower" other elements or features would then be oriented "above" the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
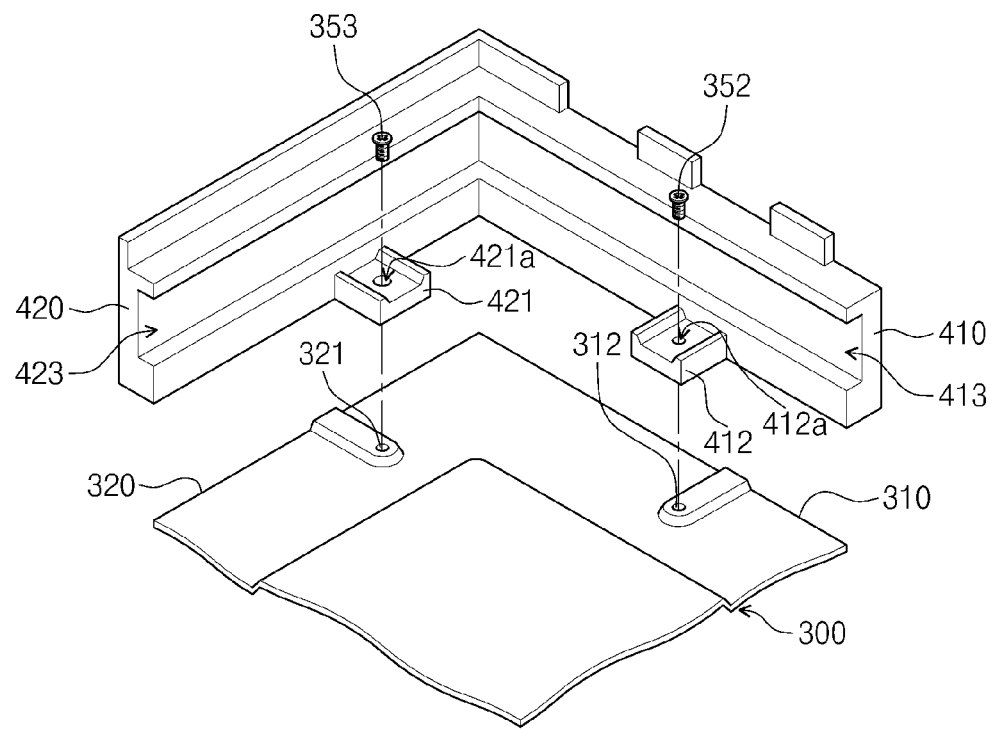
FIG. 2 is a partial enlarged perspective view of the display apparatus shown in FIG. 1.
Figure 3:
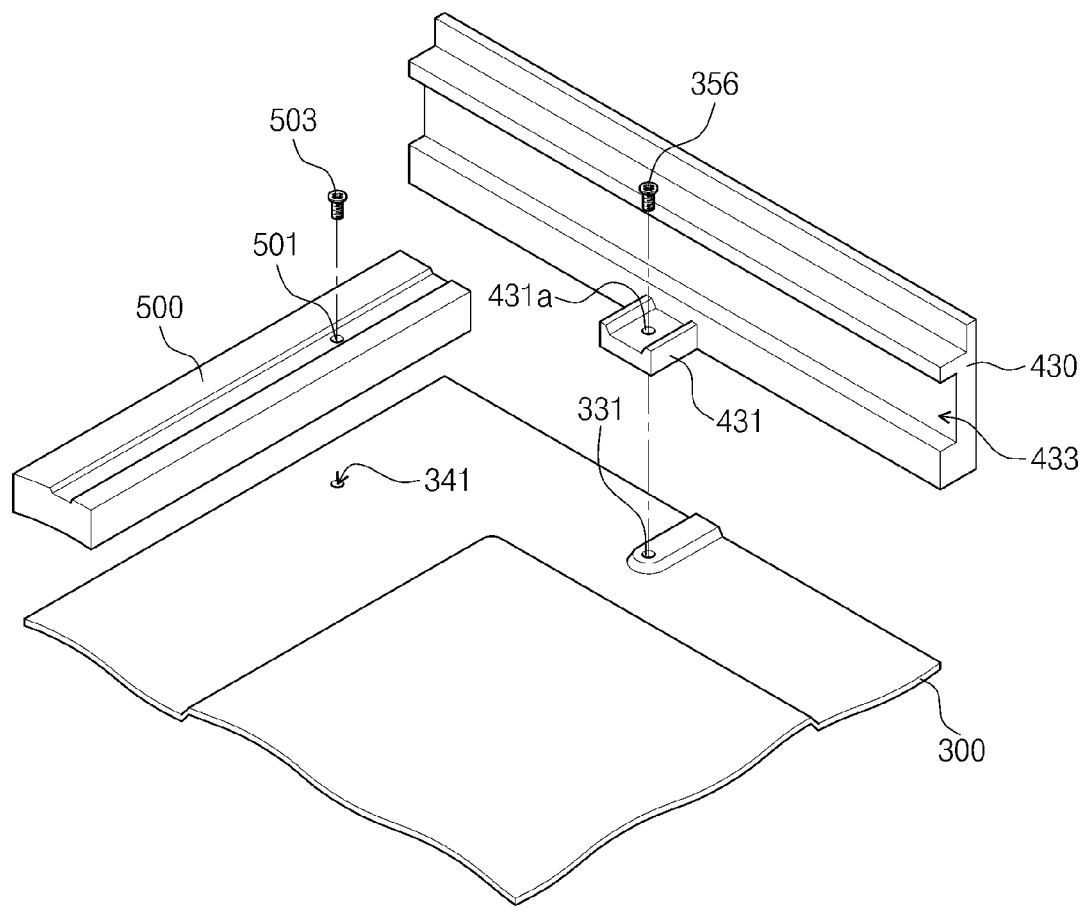
FIG. 3 is a perspective view showing an exemplary embodiment of a coupling position between a bottom plate and a heat sink plate shown in FIG. 1 according to the invention.

FIG. 1 is an exploded perspective view showing an exemplary embodiment of a display apparatus according to the invention, FIG. 2 is a partially enlarged perspective view of the display apparatus shown in FIG. 1, and FIG. 3 is a perspective view showing an exemplary embodiment of a coupling position between a bottom plate and a heat sink plate shown in FIG. 1 according to the invention.

Referring to FIG. 1, a display apparatus 1000 includes a display unit 100, a backlight unit 200, a bottom plate 300, a mold frame 400, a heat sink plate 500 and a side mold 600.

When viewed in a plan view, the display apparatus 1000 has a substantially rectangular shape. A short axis direction of the display apparatus 1000 is referred to as a first direction D1 and a long axis direction of the display apparatus 1000 is referred to as a second direction D2.

The display unit 100 includes a display panel 110 which displays an image, a driving chip 130 to apply a driving signal to the display panel 110, and a printed circuit board (not shown) electrically connected to the display panel 110.

The display panel 110 includes a first substrate 111, a second substrate 112 facing the first substrate 111 while being coupled to the first substrate 111, and a liquid crystal layer (not shown) interposed between the first substrate 111 and the second substrate 112. As an example, FIG. 1 shows a liquid crystal display panel as the display panel 110, but the display panel 110 of the invention is not be limited to the liquid crystal display panel.

The first substrate 111 includes a plurality of pixels arranged thereon in a matrix form, and each pixel includes a gate line (not shown) extended in the first direction D1, a data line (not shown) extended in the second direction D2 and insulated from the gate line while crossing the gate line, and a pixel electrode (not shown). In addition, each pixel includes a thin film transistor (not shown) electrically connected to the gate line, the data line and the pixel electrode.

The second substrate 112 includes a plurality of color pixels, such as red, green and blue ("RGB") color pixels (not shown), and a common electrode (not shown) facing the pixel electrode of the first substrate 111. In an alternative exemplary embodiment, the first substrate 111 may include the color pixels and/or the common electrode. The liquid crystal layer includes liquid crystal molecules aligned in accordance with an electric field formed between the pixel electrode and the common electrode to control a transmittance of the light provided from the backlight unit 200, thereby displaying a desired image.

The driving chip 130 is disposed at a side portion of the first substrate 111 to apply a data signal to the data line. The driving chip 130 generates the data signal applied to the data line of the display panel 110 in response to an external signal. The external signal is provided from the printed circuit board and includes an image signal, various control signals and a driving voltage.

A gate driving circuit (not shown) is disposed on a side portion of the first substrate 111 different from that on which the driving chip 130 is disposed, such as through a thin film process, to apply a gate signal to the gate line. Thus, the gate driving circuit may be built in the display panel 110.

As another exemplary embodiment, the driving chip 130 may be configured to include two or more chips including a data driving chip and a gate driving chip, and mounted on the first substrate 111 through a chip-on-glass process.

The printed circuit board is physically and/or electrically connected to the display panel 110 by a plurality of carrier packages ("TCPs") 120. A plurality of driving chips 130 is mounted on the TCPs 120. The TCPs 120 are bent toward the bottom plate 300 to surround a sidewall of the mold frame 400. Although not shown in figures, the printed circuit board connected to the TCPs 120 is disposed on a rear surface of the bottom plate 300 where the TCPs 120 are bent toward the bottom plate 300 to surround a sidewall of the mold frame 400.

The backlight unit 200 includes a light source part 210 which generates the light, and a light guide plate 220 to guide the light from the light source part 210 to the display panel 110. The light guide plate 220 may include long and short sides, a light exiting surface facing the display panel 110, an opposite surface facing the light exiting surface, and side surfaces connecting the light exiting and opposite surfaces to each other.

In the illustrated exemplary embodiment, the backlight unit 200 may be an edge-illumination type backlight unit. That is, the light source part 210 is disposed under (e.g., at a lower plane than) the display panel 110 and supplies the light to at least one side surface of the light guide plate 220, and the light guide plate 220 guides the light to the display panel 110. The side surface to which light is supplied from the light source part 210 may be otherwise referred to as a light incident side surface.

The light source part 210 includes a plurality of light sources such as light emitting diodes ("LED") 211, and a light source bar such as an LED bar 212 extended along the one side surface of the light guide plate 220. The LEDs 211 are mounted on the LED bar 212 and spaced apart from each other at regular intervals in the extension direction of the LED bar 212.

The backlight unit 200 includes a diffusion plate 230 disposed between the light guide plate 220 and the display unit 100, a plurality of optical sheets 240 disposed above the light guide plate 220, and a reflective sheet 250 disposed under the light guide plate 220.

The diffusion plate 230 is disposed on the light guide plate 220 to diffuse light exiting through the light exiting surface of the light guide plate 220, and thus the uniformity in brightness and the viewing angle of the display apparatus 1000 are improved. The optical sheets 240 include at least one light-condensing sheet to condense the light, and a protective sheet disposed on the light-condensing sheet to protect the light-condensing sheet, thereby condensing the light exiting from the light guide plate 220. The reflective sheet 250 reflects the light leaked from the light guide plate 220 to allow the leaked light to be re-incident to the light guide plate 220.

The bottom plate 300 has a substantially rectangular plate shape. As illustrated in FIG. 1, the bottom plate 300 is a substantially planar member, and does not itself include a sidewall. The mold frame 400 includes first, second and third sidewalls 410, 420, and 430 respectively extended along first, second and third sides (e.g., edges) 310, 320, and 330 of the bottom plate 300. The mold frame 400 does not itself include a planar member from which the sidewalls 410, 420 and 430 extend. The mold frame 400 is coupled to the bottom plate 300 to define a receiving space. That is, the first to third sidewalls 410, 420 and 430 are essentially sidewalls of a bottom chassis formed by the mold frame 400 and the bottom plate 300, where the bottom plate 300 is essentially a bottom portion of the bottom chassis. Since the bottom chassis of the display apparatus 1000 effectively includes only one sidewall (e.g., defined by the mold frame 400), a narrow bezel structure can be applied to reduce an overall size of the display apparatus 1000.

The first, second and third sidewalls 410, 420, and 430 of the mold frame 400 coupled to the bottom plate 300 defines an inlet portion 440 which exposes the receiving space. The inlet portion 440 is adjacent to a fourth side (e.g., edge) 340 of the bottom plate 300, such that the backlight unit 200 may be inserted into the receiving space through the inlet portion 440. The first, second and third sidewalls 410, 420, and 430 may form a single, unitary, indivisible mold frame 400, but the invention is not limited thereto or thereby.

Referring to FIGS. 1 to 3, the mold frame 400 includes first to sixth protrusions elongated from an inner surface of the first, second, and third sidewalls 410, 420 and 430, toward the receiving space and facing the bottom plate 300.

As illustrated in FIGS. 1 to 3, second to sixth protrusions 412, 421, 422, 431 and 432 are respectively protruded from the first, second, and third sidewalls 410, 420 and 430 to face the bottom plate 300. In detail, the first protrusion (not shown) and the second protrusion 412 are protruded from the first sidewall 410, the third and fourth protrusions 421 and 422 are protruded from the second sidewall 420, and the fifth and sixth protrusions 431 and 432 are protruded from the third sidewall 430. While two protrusions are illustrated with respect to one sidewall of the mold frame 400, the invention is not limited thereto.

A thru-hole is respectively provided in the first to sixth protrusions of the mold frame 400. As illustrated in FIGS. 1 to 3, the protrusions 412, 421, 422, 431 and 432 are provided with thru-holes 412a, 421a, 422a, 431a and 432a extended therethrough, respectively. Although not shown, the first protrusion is also provided with a thru-hole. The bottom plate 300 is partially protruded in areas respectively corresponding to the first to sixth protrusions of the mold frame 400. As illustrated in FIGS. 1 to 3, the bottom plate 300 includes first to sixth engaging holes 311, 312, 321, 322, 331 and 332 extended through a respective protruded area to respectively correspond to the first to sixth thru-holes (first, not shown), 412a, 421a, 422a, 431a and 432a. An upper surface of the protruded area of the bottom plate 300 may be disposed on a different plane than that of a bottom portion of the bottom plate 300.

The mold frame 400 and the bottom plate 300 are coupled to each other by first to sixth engaging members such as screws. While FIGS. 2 and 3 show only three engaging screws 352, 353 and 356 among the first to sixth engaging screws, the mold frame 400 and the bottom plate 300 are coupled to each other by six engaging members such as six engaging screws.

In detail, when the first to sixth engaging screws are respectively engaged into the first to sixth engaging holes defined in the bottom plate 300 after passing through the first to sixth thru-holes defined in the first to sixth protrusions of the mold frame 400, the mold frame 400 and the bottom plate 300 are coupled to each other.

Referring to FIGS. 1 and 3, the heat sink plate 500 is disposed under the backlight unit 200 to be adjacent to the inlet portion 440 and coupled to the bottom plate 300. In detail, the heat sink plate 500 is substantially in parallel to the bottom plate 300 and placed on the bottom plate 300.

Engaging holes are defined in the heat sink plate 500 corresponding to engaging holes of the bottom plate 300. As illustrated in FIGS. 1 to 3, at least two engaging holes 501 and 502 are defined in the heat sink plate 500, and at least two engaging holes 341 and 342 are defined in the bottom plate 300 corresponding to the engaging holes 501 and 502 of the heat sink plate 500. Thus, the heat sink plate 500 is coupled to the bottom plate 300 by an engaging member such as engaging screw 503, which may be sequentially extended through the engaging holes 501 and 341, and 502 and 342.

Figure 4:
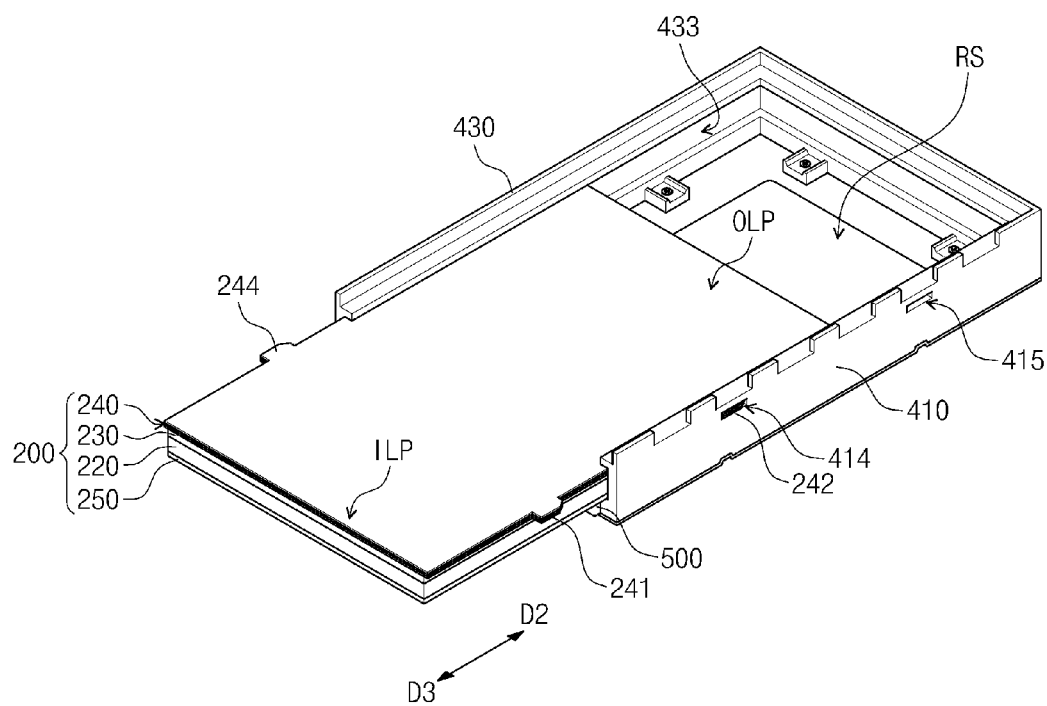
FIG. 4 is a perspective view showing an exemplary embodiment of a process of inserting a backlight unit into a mold frame according to the invention.
Figure 5:
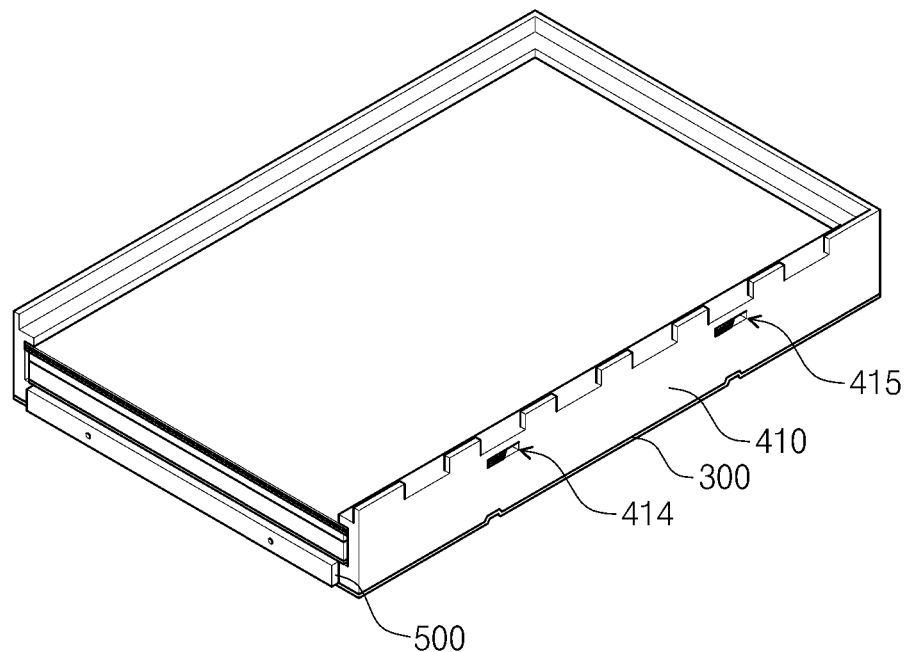
FIG. 5 is a perspective view showing an exemplary embodiment of a backlight unit accommodated in a mold frame according to the invention.

FIG. 4 is a perspective view showing an exemplary embodiment of a process of inserting a backlight unit into a mold frame according to the invention, and FIG. 5 is a perspective view showing an exemplary embodiment of a backlight unit accommodated in a mold frame according to the invention.

Referring to FIGS. 1, 4, and 5, when the mold frame 400 and the bottom plate 300 are coupled to each other through the above-mentioned method, the receiving space RS is formed. In an exemplary embodiment of manufacturing the display apparatus 1000, the heat sink plate 500 may be coupled to the bottom plate 300 before or after the backlight unit 200 is disposed in the receiving space RS.

In addition, recesses are defined in the first, second and third sidewalls 410, 420 and 430 of the mold frame 400. In particular, first and second sliding recesses 413 and 433 are respectively defined in the first and third sidewalls 410 and 430, which are adjacent to the inlet portion 440 and extended in the second direction D2. Therefore, in an exemplary embodiment of inserting the backlight unit 200 into the mold frame 400, the backlight unit 200 is inserted into the receiving space RS through the inlet portion 440 defined in the mold frame 400, and then slides along the first and second sliding recesses 413 and 433, such that the backlight unit 200 is accommodated in the receiving space RS.

When a portion of the backlight unit 200, on which the light source part 210 is disposed, is referred to as a light incident portion ILP, a portion opposite to the light incident portion ILP is referred to as an opposite portion OLP. The opposite portion OLP of the backlight unit 200 is inserted into a recess 423 defined in the second sidewall 420. The recesses 413, 423 and 433 collectively defined a continuous space in which the backlight unit 200 is accommodated.

As shown in FIGS. 1, 4, and 5, the optical sheets 240 of the backlight unit 200 include first and second extension portions 241 and 242 extended from a first side of a main portion thereof, which is substantially in parallel to the second direction D2, and third and fourth extension portions 243 and 244 extended from a second side of the main portion thereof, which is facing and substantially in parallel to the first side. In one exemplary embodiment, each of the layers of the optical sheets 240 includes the extension portions (refer to FIGS. 9 and 10), but the invention is not limited thereto or thereby.

First and second fixing holes 414 and 415 are defined in the first sidewall 410 of the mold frame 400 and extended through portions respectively corresponding to the first and second extension portions 241 and 242 of the accommodated optical sheets 240. Third and fourth fixing holes (not shown) are defined in the third sidewall 430 of the mold frame 400 and extended through portions respectively corresponding to the third and fourth extension portions 243 and 244 of the accommodated optical sheets 240. The fixing holes may be open to the receiving space RS and open from an outside of the mold frame 400 such that the extension portions of the accommodated optical sheets 240 protrude from the receiving space RS toward an outside of the mold frame 400, but the invention is not limited thereto or thereby.

In FIGS. 1, 4, and 5, for the convenience of explanation, the first and second fixing holes 414 and 415 are defined to be extended completely through the first sidewall 410, but are not be limited thereto or thereby. That is, the first and second fixing holes 414 and 415 may be defined as recessed inner portions of the first sidewall 410 extending from the receiving space RS by a predetermined depth not exceeding a thickness of the sidewall.

The first to fourth extension portions of the optical sheets 240 have a rectangular shape when viewed in a plan view. As illustrated, each of the first and second extension portions 241 to 244 includes two distal corners defined by a side (or edge) substantially in parallel to a direction in which the backlight unit 200 slides along the sliding recesses 413 and 433 (e.g., the second direction D2), and two sides (or edges) substantially vertical to the sliding direction.

In the illustrated exemplary embodiment, a distal corner among the two distal corners of each of the first to fourth extension portions, which is disposed closer to the opposite portion OLP and firstly inserted into the receiving space RS when the backlight unit 200 slides into the receiving space RS, is chamfered to form a inclination side. Referring to FIGS. 1, 4 and 5, for example, when the backlight unit 200 slides in the sliding recesses 413 and 433 and along the second direction D2, the first and second extension portions 241 and 242 are smoothly and respectively accommodated in the first and second fixing holes 414 and 415 due to the chamfered inclination side. Although not shown in figures, when the backlight unit 200 slides along the second direction D2, the third and fourth extension portions 243 and 244 are smoothly and respectively accommodated in the third and fourth fixing holes due to the chamfered inclination side.

In addition, each of the first to fourth extension portions 241 to 244 includes a catching side substantially vertical to the first and second sides of the optical sheets 240. The catching side of each of the first and second extension portions 241 and 242 may reduce or effectively prevent the optical sheets 240 from being withdrawn in a third direction D3 opposite to the second direction D2 after the first and second extension portions 241 and 242 are respectively accommodated in the first and second fixing holes 414 and 415. Similarly, the catching side of each of the third and fourth extension portions 243 and 244 may reduce or effectively prevent the optical sheets 240 from being withdrawn in the third direction D3 opposite to the second direction D2 after the third and fourth extension portions 243 and 244 are respectively accommodated in the third and fourth fixing holes.

With the backlight unit 200 completely accommodated in the receiving space RS defined by the mold frame 400 and the bottom plate 300, the heat sink plate 500 is disposed under the backlight unit 200 to be adjacent to the inlet portion 440 and coupled to the bottom plate 300.

Figure 6:
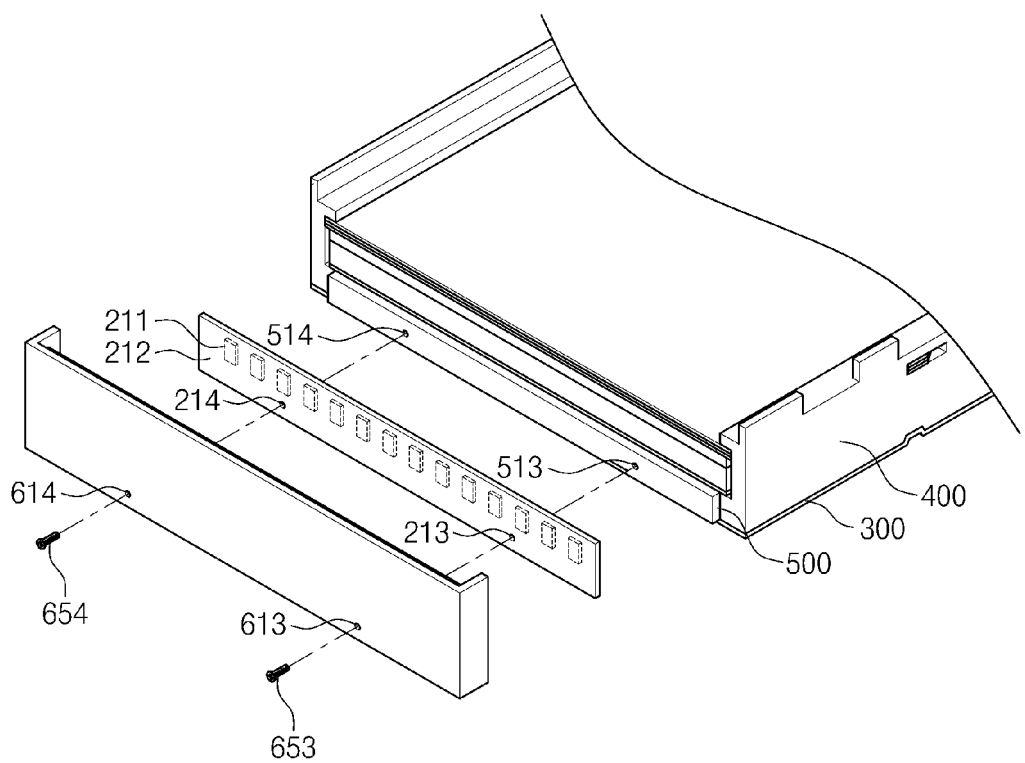
FIG. 6 is a perspective view showing an exemplary embodiment of a process of coupling a side mold and a light source to a heat discharge plate according to the invention.

FIG. 6 is a perspective view showing an exemplary embodiment of a process of coupling aside mold and an LED bar to a heat sink plate according to the invention.

Referring to FIG. 6, when the backlight unit 200 is completely accommodated in the receiving space RS defined by the mold frame 400 and the bottom plate 300, the LED bar 212 is disposed to face the one side surface of the light guide plate 220. In particular, a front surface of the LED bar 212, on which the LEDs 211 are mounted, faces the light incident side surface of the light guide plate 220. Thus, the light emitted from the LEDs 211 is incident to the light guide plate 220 through the one side surface of the light guide plate 220.

The side mold 600 is disposed to correspond to the inlet portion 440 of the mold frame 400 and covers a rear surface of the LED bar 212. In addition, both of opposing ends of the side mold 600 are engaged with the mold frame 400 to reduce or effectively prevent the light from leaking.

As shown in FIG. 6, the side mold 600 and the LED bar 212 are fixed to the heat sink plate 500 by seventh and eighth engaging members such as engaging screws 653 and 654. In detail, first and second engaging recesses 513 and 514 are defined in the heat sink plate 500 to be spaced apart from each other, seventh and eighth thru-holes 613 and 614 are defined extended through the side mold 600 to respectively correspond to the first and second engaging recesses 513 and 514, and ninth and tenth thru-holes 213 and 214 are defined extended through the LED bar 212.

As illustrated in FIG. 6, the seventh engaging screw 653 is engaged with the first engaging recess 513 after passing through the seventh and ninth thru-holes 613 and 213, and the eighth engaging screw 654 is engaged with the second engaging recess 514 after passing through the eighth and tenth thru-holes 614 and 214.

Although not shown in figures, both ends of the side mold 600 may have an additional structure coupled with the mold frame 400.

Figure 7:
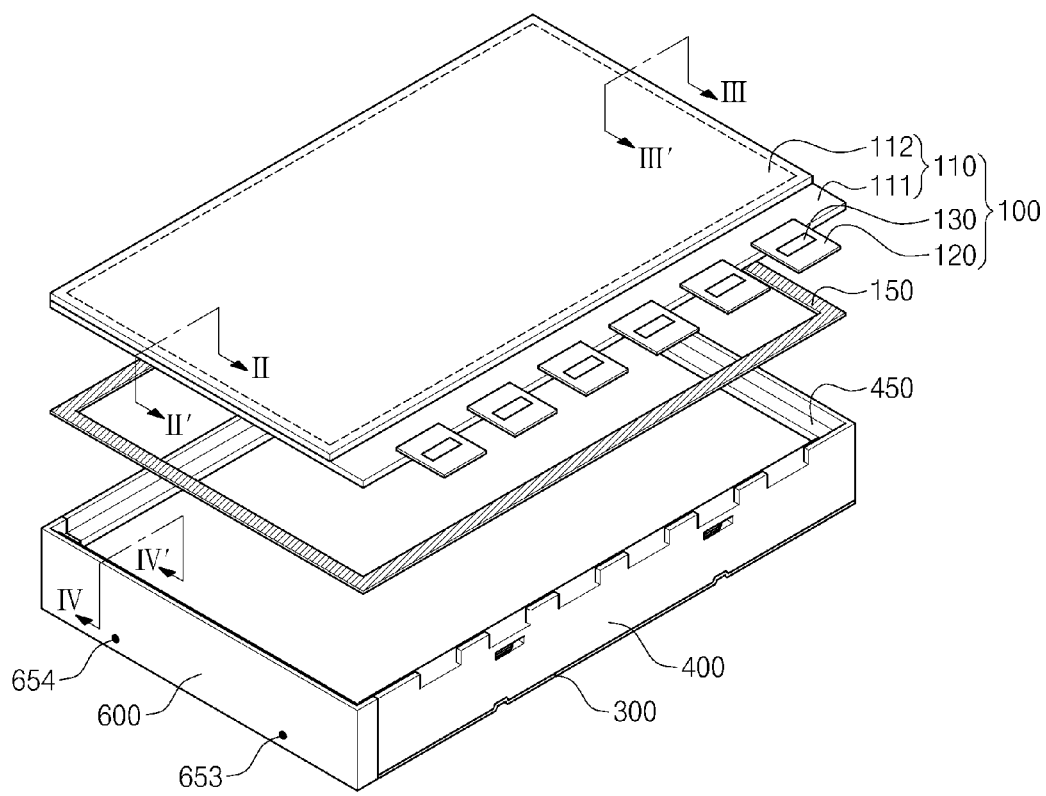
FIG. 7 is a perspective view showing an exemplary embodiment of a display panel placed on a mold frame according to the invention.

FIG. 7 is a perspective view showing an exemplary embodiment of a display panel placed on a mold frame according to the invention.

Referring to FIG. 7, after the bottom plate 300, the mold frame 400, the heat sink plate 500 and the side mold 600 are coupled to each other and the backlight unit 200 is accommodated in the receiving space RS, the display panel 110 is placed on the mold frame 400.

A pair of protruding portions extended from an inner side of each of the sidewalls 410, 420 and 430 of the mold frame 400 may define the recesses, 413, 423 and 433, respectively therebetween. The backlight unit 200 may be slidably disposed between the pair of protruding portions such that the backlight unit 200 is retained between the pair of protruding portions and in the recesses 413, 423 and 433, when the backlight unit 200 is accommodated in the receiving space RS. The mold frame 400 may further include a step portion 450 disposed toward an upper end of the mold frame 400 such that the display panel 110 is stably placed on the step portion 450 of the mold frame 400. Accordingly, the mold frame 400 supports and guides the display panel 110. The step portion 450 may be formed by an inner surface of a sidewall and an upper surface of the upper protruding portion of a pair of protruding portions. As illustrated in FIG. 7 for example, an inner surface of the second sidewall 420 and an upper surface of the upper protruding portion extended from the inner side of second sidewall 420, may form a step upon which the display panel 110 is disposed.

In addition, the upper end (or edge) of one sidewall of the mold frame 400 includes recessed portions to respectively correspond to the TCPs 120. In providing the sidewall including the recessed portions, portions of the sidewall may be cut-away from the upper end (or edge) of the one sidewall of the mold frame 400 provide passages through which the TCPs 120 extend.

A fixing member or adhesive member such a double-sided tape 150 is disposed between the display panel 110 and the step portion 450 of the mold frame 400. The double-sided tape 150 fixes the display panel 110 to the upper end of the mold frame 400. Therefore, although a top chassis used to fix the display panel 110 to the backlight unit 200 is omitted from the display apparatus 1000, the display panel 110 may be stably fixed to the mold frame 400 by the double-sided tape 150.

In addition, the double-sided tape 150 includes a light blocking material. Thus, the double-sided tape 150 may reduce or effectively prevent the light output from the backlight unit 200 from leaking to outside.

Figure 8:
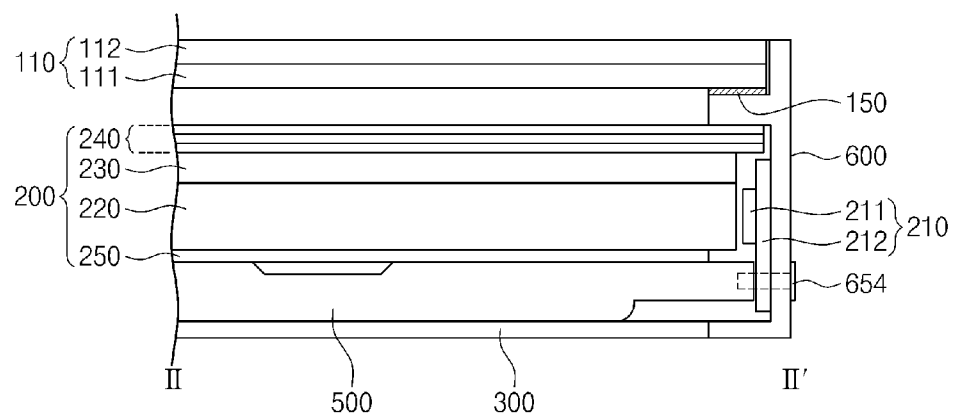
FIG. 8 is a cross-sectional view taken along line II-II' shown in FIG. 7.

FIG. 8 is a cross-sectional view taken along line II-II' shown in FIG. 7. Particularly, FIG. 8 shows a cross-section of the light incident portion ILP of the backlight unit 200.

Referring to FIG. 8, the heat sink plate 500 is disposed on the bottom plate 300 to be adjacent to the light incident portion ILP of the backlight unit 200. Here, the heat sink plate 500 includes a material with an excellent heat sink property such as heat conductivity when compared to that of the bottom plate 300. Accordingly, the heat sink plate 500 may effectively disperse heat generated from the LEDs 211 and transmitted to the light guide plate 220.

The heat sink plate 500 may have a cross-sectional thickness larger than that of the bottom plate 300 and the mold frame 400 in order to improve the heat sink property thereof. Where the cross-sectional thickness of the heat sink plate 500 is larger than that of the bottom plate 300 and the mold frame 400, the first and second engaging recesses 513 and 514 (refer to FIG. 6) used to fix the LED bar 212 and the side mold 600 thereto, may be sufficiently defined extended inward from the one side of the heat sink plate 500.

As shown in FIG. 8, the eighth engaging screw 654 is engaged with the second engaging recess 514 after passing through the eighth and tenth thru-holes 614 and 214, and thus the side mold 600 and the LED bar 212 may be fixed to the heat sink plate 500.

In addition, the side mold 600 includes a step portion 650 (refer to FIG. 12) at an upper end of the side mold 600, to support and guide the display panel 110 as similar to the mold frame 400. The step portions 450 and 650 may provide a substantially continuous surface upon which the display panel 110 is disposed. An upper surface of the step portions 450 and 650 may be substantially coplanar to provide a surface upon which the display panel 110 is disposed.

Figure 9:
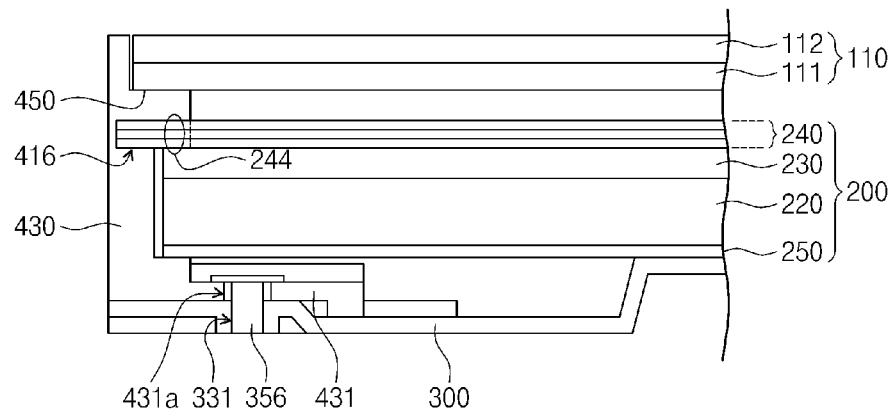
FIG. 9 is a cross-sectional view showing another exemplary embodiment of a display apparatus according to the invention.
Figure 10:
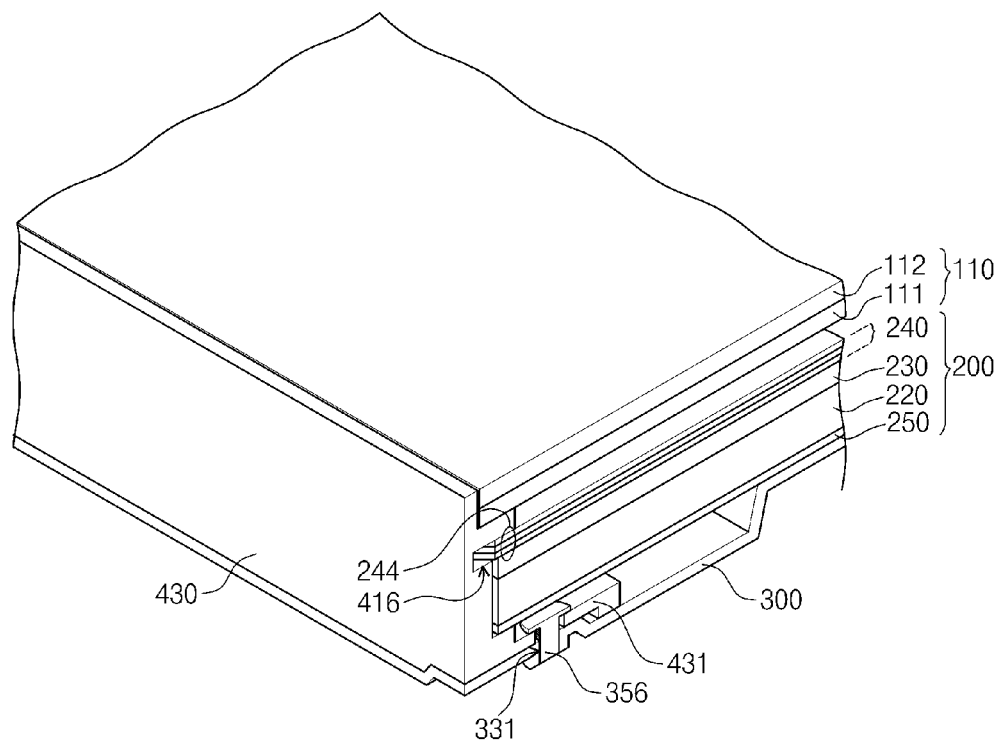
FIG. 10 is a partially-cut perspective view of the display panel and the mold frame shown in FIG. 7.

FIG. 9 is a cross-sectional view showing another exemplary embodiment of a display apparatus and FIG. 10 is a partially-cut perspective view of the display apparatus shown in FIG. 9. In FIGS. 9 and 10, the same reference numerals denote the same elements in FIGS. 1 to 8, and thus detailed descriptions of the same elements will be omitted.

Referring to FIGS. 9 and 10, a fixing recess 416 is extended into the third sidewall 430 of the mold frame 400 to accommodate the fourth extension portion 244 of the optical sheets 240. The fixing recess 416 is open to the receiving space RS, however, is closed to an outside of the mold frame 400. In contrast, FIGS. 4 and 5 show the first and second fixing holes 414 and 415 are extended to penetrate through the first sidewall 410 such that the first and second fixing holes 414 and 415 are open to both the receiving space RS and the outside of the mold frame 400.

However, the fixing recess 416 may be defined by a recessed extending from inner side surface of the third sidewall 430 by a predetermined depth.

Figure 11:
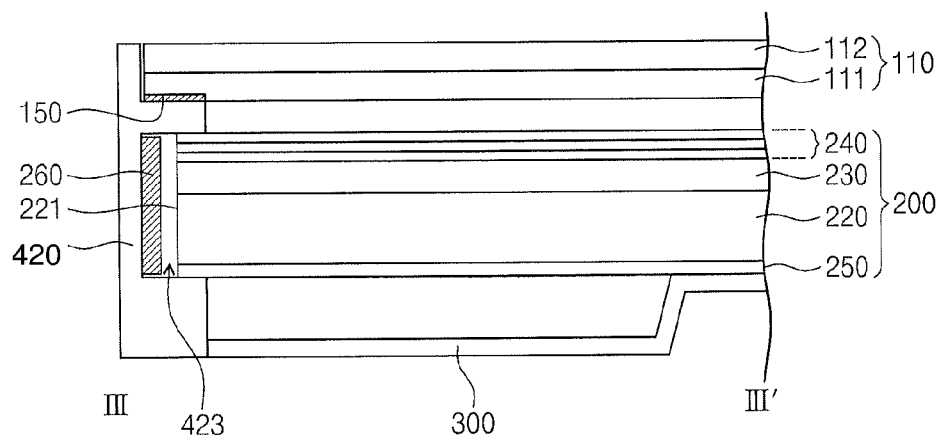
FIG. 11 is a cross-sectional view taken along line III-III' shown in FIG. 7.

FIG. 11 is a cross-sectional view taken along line III-III' shown in FIG. 7.

Referring to FIG. 11, the backlight unit 200 further includes a buffer member such as a buffer tape 260 accommodated in the recess 423 defined in the second sidewall 420 of the mold frame 400. The buffer tape 260 is attached to an inner wall of the recess 423 of the second sidewall 420 to face an opposite surface 221 of the light guide plate 220 which is opposite to and faces a light incident side surface of the light guide plate 220. The buffer tape 260 guides the light guide plate 200 to an initial position while the light guide plate 200 slides into the receiving space RS.

In addition, where the light guide plate 220 is expanded by heat generated from the light source part 210, the buffer tape 260 is deformed by the expanded portion of the light guide plate 220 and to absorb impact of the expanding light guide plate 220. As an example, the buffer tape 260 includes a urethane foam, but is not limited thereto or thereby.

Figure 12:
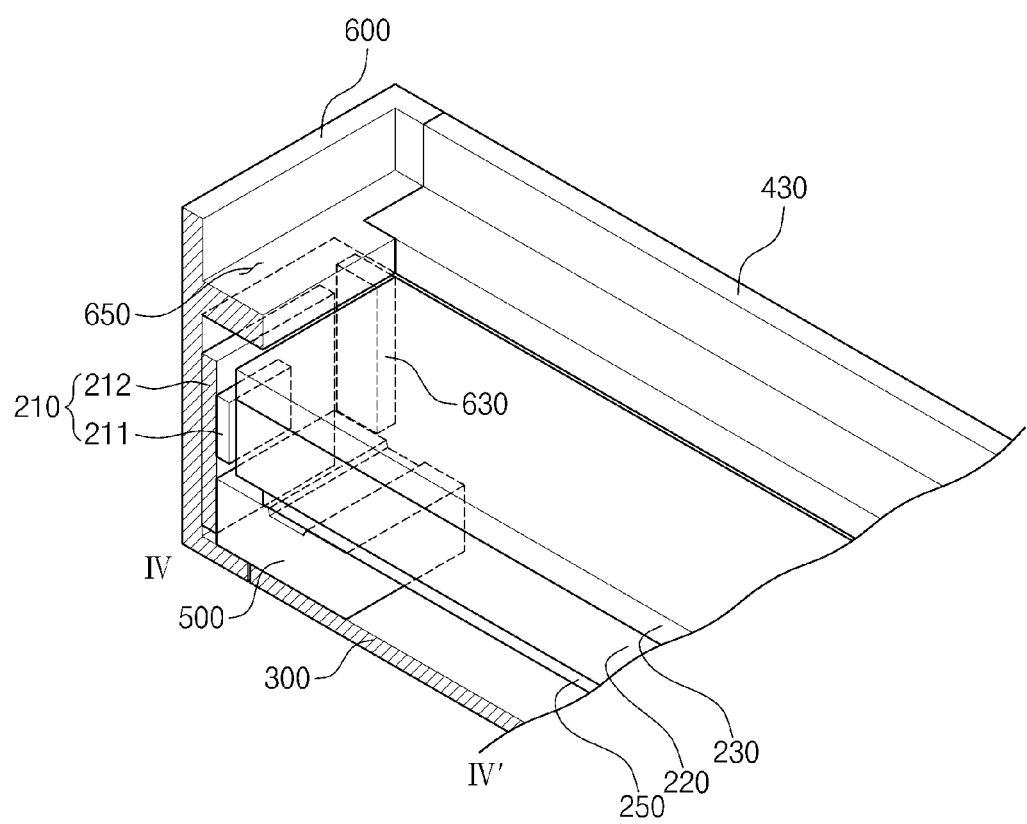
FIG. 12 is a perspective cross-sectional view taken along line IV-IV' shown in FIG. 7.

FIG. 12 is a perspective cross-sectional view taken along line IV-IV' shown in FIG. 7.

Referring to FIG. 12, the side mold 600 may further include first and second guide bars respectively disposed at opposing ends of the side mold 600 to allow the LEDs 211 to be spaced apart from the light incident side surface of the light guide plate 220.

As shown in FIG. 12, the first guide bar 630 is protruded from an inner side surface of the side mold 600 toward the light incident side surface of the light guide plate 220. In a length direction of the side mold 600, the LED bar 212 is positioned between the first guide bar 630 and the second guide bar (not shown) at opposing ends of the side mold 600.

A protruded distance of the first guide bar 630 from the inner side surface of the side mold 600 may be set to maintain a desired distance between the light incident side surface of the light guide plate 220 and the LEDs 211. That is, since a hot spot phenomenon occurs at the light incident portion ILP of the backlight unit 200 when the distance between the light incident side surface of the light guide plate 220 and the LEDs 211 is too short, the distance between the light incident side surface of the light guide plate 220 and the LEDs 211 is required to be properly maintained to avoid the hot spot phenomenon.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
    a bottom plate;
    a mold frame which when coupled to the bottom plate defines:
        a sidewall extended from the bottom plate, the sidewall and the bottom plate defining a receiving space, and
        a sliding recess which is at an inner portion of the sidewall and exposed to receiving space,
    a display unit which is on an upper end of the mold frame and configured to display an image with light;
    a backlight unit which is configured to be accommodated in the receiving space and generate the light, the backlight unit comprising:
        a light source part which is configured to generate the light, and
        a light guide plate which is configured to guide the generated light to the display unit;
    an inlet portion which is defined by the mold frame and the bottom plate coupled to each other, and exposes the receiving space and a side portion of the light guide plate accommodated in the receiving space; and
    a side mold which covers the side portion of the accommodated light guide plate exposed by the inlet portion,
    wherein with the mold frame and the bottom plate coupled to each other,
        the light guide plate is accommodated in the receiving space through the inlet portion by direct engagement of the light guide plate with the sliding recess,
        a portion of the bottom plate is extended to overlap the accommodated light guide plate, and
        the light guide plate directly engaged with the sliding recess disposes the mold frame between the accommodated light guide plate and the extended portion of the bottom plate.

2. The display apparatus of claim 1, wherein
    the bottom plate has a rectilinear shape having four sides in a plan view,
    the mold frame defines the sidewall which extends from an edge of the bottom plate and along three sides of the bottom plate, and
    the inlet portion of the mold frame is defined at a remaining side of the bottom plate.

3. The display apparatus of claim 2, wherein
    the mold frame further comprises a protrusion which is extended from a lower end of the sidewall and toward the receiving space, and faces the bottom plate, and
    the protrusion of the mold frame is coupled to the bottom plate by a first engaging member received by the protrusion and the bottom plate.

4. The display apparatus of claim 2, further comprising a heat sink plate which is configured to be disposed under the backlight unit at the inlet portion and coupled to the bottom plate,
    wherein the side mold is coupled to the heat sink plate.

5. The display apparatus of claim 1, wherein
    the side portion of the accommodated light guide plate exposed by the inlet portion defines a light incident side surface of the light guide plate,
    the light source part comprises:
        a light source mounting bar adjacent to the light incident side surface of the light guide plate, and
        a plurality of light sources arranged on the light source mounting bar, and
    the light source mounting bar is between the side mold and the light incident side surface of the light guide plate.

6. The display apparatus of claim 5, wherein the side mold and the light source mounting bar are coupled to the heat sink plate by a second engaging member.

7. The display apparatus of claim 5, wherein the side mold comprises a guide bar which is protruded from an inner side surface thereof toward the light incident side surface of the light guide plate and maintains a distance between the light source part and the light incident side surface of the light guide plate.

8. The display apparatus of claim 1, further comprising an opposite recess which is defined by portions of the mold frame, exposed to the receiving space, opposite to the inlet portion and continuous with the sliding recess,
    wherein
    the side portion of the accommodated light guide plate exposed by the inlet portion defines a light incident side surface of the light guide plate,
    the light guide plate comprises an opposite side surface opposing the light incident side surface thereof, and
    the backlight unit further comprises a guide member which is in the opposite recess, faces the opposite side surface of the light guide plate and guides the light guide plate to an initial position in the receiving space.

9. The display apparatus of claim 8, wherein the guide member comprises a deformable material which absorbs an impact.

10. The display apparatus of claim 1,
    wherein
    the backlight unit further comprises an optical sheet which is between the light guide plate and the display unit, the optical sheet comprising an extension portion extended from a side thereof and toward the mold frame and accommodated in the receiving space through the inlet portion by direct engagement with the sliding recess, and
    the mold frame further defines a fixing recess which is extended from an inner side of the sidewall, the fixing recess exposed to the receiving space and in which the extension portion of the optical sheet is accommodated.

11. The display apparatus of claim 10, wherein
    a sliding direction is defined from the inlet portion to a side of the display apparatus opposite to the inlet portion,
    the extension portion of the optical sheet comprises two distal corners defined by a first edge of the extension portion parallel to the sliding direction meeting second edges of the extension portion vertical to the sliding direction, and
    a distal corner among the two distal corners of the extension portion further from the inlet portion is chamfered to define an inclination side of the extension portion and is firstly inserted into the receiving space when the backlight unit is accommodated into the receiving space.

12. The display apparatus of claim 11, wherein a second edge among the second edges of the extension portion vertical to the sliding direction defines a catching edge of the extension portion, and restricts withdrawal of the extension portion from the fixing recess and movement of the optical sheet in a direction opposite to the sliding direction.

13. The display apparatus of claim 1, wherein the mold frame and the side mold each comprises a step portion at an upper end thereof and upon which the display unit is disposed.

14. The display apparatus of claim 13, further comprising an adhesive member which is between the step portion and the display unit, and fixes the display unit to the mold frame and the side mold.

15. A method of manufacturing a display apparatus, comprising:
    coupling a mold frame to a bottom plate to define:
        a receiving space with the bottom plate, the mold frame coupled to the bottom plate defining a sidewall which is extended from the bottom plate and a sliding recess which is at an inner portion of the sidewall and exposed to the receiving space, and
        an inlet portion which exposes the receiving space,
    providing a display unit configured to display an image with light, on an upper end of the mold frame;
    preparing a backlight unit which is accommodated in the receiving space and generates the light, the backlight unit comprising:
        a light source part which is configured to generate the light; and
        a light guide plate which is configured to guide the generated light to the display unit,
    accommodating the light guide plate of the backlight unit into the receiving space through the inlet portion by direct engagement of the light guide plate with the sliding recess,
    wherein with the light guide plate accommodated in the receiving space,
        a side portion of the accommodated light guide plate is exposed to outside the coupled mold frame and bottom plate via the inlet portion;
        a portion of the bottom plate is extended to overlap the accommodated light guide plate, and
        the light guide plate directly engaged with the sliding recess disposes the mold frame between the accommodated light guide plate and the extended portion of the bottom plate,
    providing a side mold which covers the exposed side portion of the accommodated light guide plate.

* * * * *